United States Patent
Stevens et al.

(10) Patent No.: US 6,884,282 B2
(45) Date of Patent: Apr. 26, 2005

(54) METHOD AND SYSTEM FOR INCREASING THE ABSORPTION SELECTIVITY OF $H_2S$ FROM A GAS CONTAINING $CO_2$ AND $H_2S$

(76) Inventors: David K. Stevens, 16945 Palos Verdes Dr., Stillwell, KS (US) 66085; Kevin M. Robertson, 1307 Irish Mist Ct., Katy, TX (US) 77450; Mark R. Tonjes, 9037 Acuff La., Lenexa, KS (US) 66215; Lindsay Wedel Dreitzler, 11330 W. $132^{nd}$ Ter., Overland Park, KS (US) 66213

( * ) Notice: Subject to any disclaimer, the term of this patent is extended or adjusted under 35 U.S.C. 154(b) by 107 days.

(21) Appl. No.: 10/437,339

(22) Filed: May 13, 2003

(65) Prior Publication Data

US 2003/0213363 A1 Nov. 20, 2003

Related U.S. Application Data

(60) Provisional application No. 60/379,804, filed on May 13, 2002.

(51) Int. Cl.[7] .......................... C01B 17/15; B01D 53/14
(52) U.S. Cl. .............................. 95/199; 95/228; 95/235; 423/228; 423/229; 261/128; 261/149; 261/151
(58) Field of Search ................................ 423/226, 228, 423/229; 261/127, 128, 147, 149, 150, 151; 95/199, 228, 229, 235; 96/251, 266

(56) References Cited

U.S. PATENT DOCUMENTS

| | | | |
|---|---|---|---|
| 3,927,153 A | * 12/1975 | Tarhan | 261/128 |
| 4,085,192 A | * 4/1978 | Van Scoy | 95/179 |
| 4,400,368 A | * 8/1983 | Diaz | 423/576.6 |
| 4,409,199 A | * 10/1983 | Blytas | 423/576.6 |
| 4,504,449 A | * 3/1985 | Doerges et al. | 423/228 |
| 4,545,965 A | 10/1985 | Gazzi et al. | |
| 4,557,911 A | 12/1985 | Goddin, Jr. et al. | |
| 4,710,211 A | * 12/1987 | Gazzi et al. | 62/634 |
| 4,798,910 A | * 1/1989 | Herrin | 564/497 |
| 4,919,912 A | 4/1990 | Taggart et al. | |
| 4,961,873 A | 10/1990 | Ho et al. | |
| 4,997,630 A | 3/1991 | Wagner et al. | |
| 5,133,949 A | * 7/1992 | Elgue et al. | 423/220 |
| 5,716,587 A | 2/1998 | Khanmamedov | |
| 6,071,484 A | 6/2000 | Dingman, Jr. et al. | |
| 6,120,581 A | 9/2000 | Markovs et al. | |
| 6,287,365 B1 | 9/2001 | Markovs et al. | |
| 6,645,272 B1 | * 11/2003 | Lemaire et al. | 95/174 |

* cited by examiner

*Primary Examiner*—Frank M. Lawrence
(74) *Attorney, Agent, or Firm*—F. Lindsey Scott

(57) ABSTRACT

A system and a method for increasing the selectivity of $H_2S$ absorption in an aqueous amine treating processes for streams containing high $CO_2$:$H_2S$ ratio mixtures in an absorption column by maintaining the temperature in the absorption column by withdrawing, cooling and returning cooled aqueous amine to the column at at least one location intermediate the sour gas inlet to the column and the lean gas outlet from the column.

19 Claims, 1 Drawing Sheet

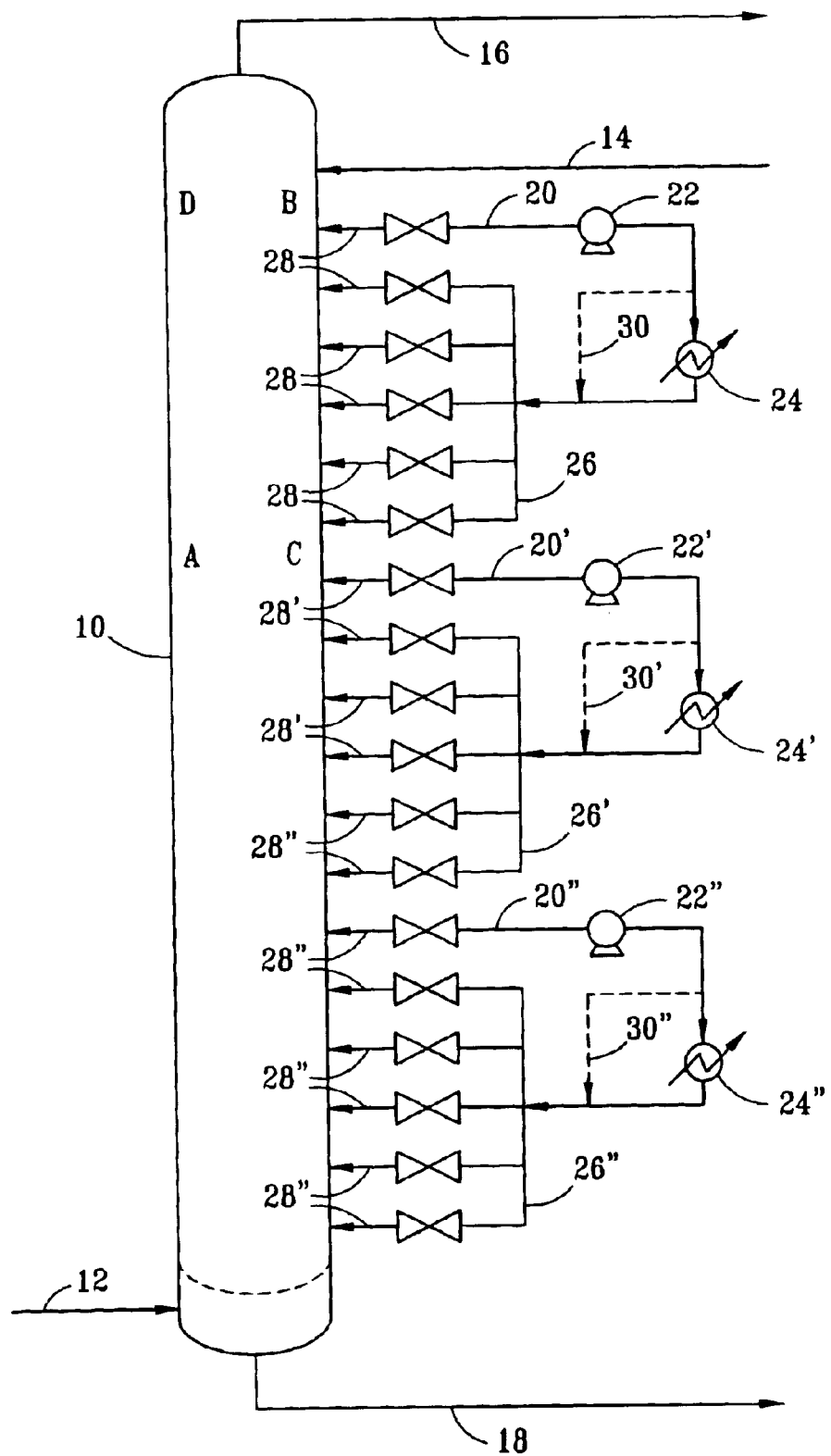

METHOD AND SYSTEM FOR INCREASING THE ABSORPTION SELECTIVITY OF $H_2S$ FROM A GAS CONTAINING $CO_2$ AND $H_2S$

RELATED CASES

This application is related to and hereby claims the benefit of the filing date of U.S. Provisional Application No. 60/379,804, which was filed May 13, 2002.

FIELD OF THE INVENTION

This invention relates to a method and a system for increasing the selectivity of $H_2S$ absorption in amine treating processes for streams containing high $CO_2:H_2S$ ratio mixtures.

BACKGROUND OF THE INVENTION

It is well known that both carbon dioxide ($CO_2$) and hydrogen sulfide ($H_2S$) can be removed from gaseous streams by treatment with aqueous amine solutions. Such processes typically comprise absorption of the $CO_2$ and $H_2S$ in a column wherein the gas and a lean aqueous amine are countercurrently contacted to produce a rich aqueous amine and a lean gas. At least a portion of the $CO_2$ and $H_2S$ is removed from the lean gas, which may be passed to further processing for further $CO_2$ and $H_2S$ absorption or the like. Alternatively, sufficient amounts of $H_2S$ may have been removed from the treated gas so that it may be safely discharged to the atmosphere or passed to other process uses. In many instances, the $CO_2$ and $H_2S$ may be contained in streams comprising hydrogen, carbon monoxide, hydrocarbons and other gaseous components.

The sour gas charged to the amine contacting process may contain $CO_2$ and $H_2S$ in varying proportions. When the $CO_2$ content is significant with respect to $H_2S$ content (i.e., a $CO_2:H_2S$ ratio of 3 or higher), then it is found that insufficient $H_2S$ may be absorbed for efficient use of the recovered $H_2S$ stream in Claus processes for the recovery of sulfur and the like.

The $H_2S$ stream is typically recovered by treatment of a rich aqueous amine stream by heating or other treatment as well known to those skilled in the art. Desirably, this $H_2S$ stream contains at least 10 and preferably at least 15 volume percent (vol. %) $H_2S$ for use as a feedstream to a Claus process.

The operation of amine contacting processes is well known to those skilled in the art. Unfortunately, as the temperature increases in the amine-contacting vessel, the selectivity of the amine absorbent for $H_2S$ is decreased. At temperatures above about 150° F., the absorption of $CO_2$ is sufficiently high so that insufficient $H_2S$ is absorbed to produce the desired $H_2S$ concentration for use in a Claus process. A continuing effort has been directed to the development of a suitably economical and effective process to selectively absorb $H_2S$ from gas streams containing $CO_2$ and $H_2S$.

Accordingly, an improved process has been sought whereby $H_2S$ may be selectively absorbed from sour gas streams containing $H_2S$ and significant quantities of $CO_2$.

SUMMARY OF THE INVENTION

According to the present invention, a method is provided for increasing the selectivity of $H_2S$ absorption from a gas containing $CO_2$ and $H_2S$ in an aqueous amine treating process, the method comprising: passing the gas into an aqueous amine-contacting vessel in countercurrent flow with the aqueous amine; maintaining the temperature in the contacting vessel at a temperature below about 150° F.; recovering a rich aqueous amine solution from the contacting vessel, the rich amine solution being selectively enriched with $H_2S$; recovering an $H_2S$ stream having an $H_2S$ content of at least about 10 volume percent $H_2S$ from the rich aqueous amine solution from the contacting vessel; and, recovering the gas at least partially depleted of $H_2S$ from the contacting vessel.

The invention further comprises a system for increasing the $H_2S$ selectivity of absorption from a gas containing $CO_2$ and $H_2S$ in an aqueous amine treating system, the system comprising: an aqueous amine contacting vessel including at least two sections, each section having a sour gas inlet, a lean aqueous amine inlet, a rich aqueous amine outlet and an outlet for a lean gas stream having a reduced $H_2S$ content; at least one aqueous amine withdrawal line positioned to withdraw aqueous amine from the contacting vessel; a heat exchanger positioned in fluid communication with the aqueous amine withdrawal line to cool the aqueous amine to a selected temperature to produce a cooled aqueous amine; and, at least one return line in fluid communication with the heat exchanger and the contacting vessel to return at least a portion of the cooled aqueous amine to the contacting vessel.

BRIEF DESCRIPTION OF THE FIGURE

The FIGURE is a schematic diagram of an aqueous amine-contacting vessel according to the present invention.

DESCRIPTION OF THE PREFERRED EMBODIMENTS

In the discussion of the FIGURE, not all thermocouples, pumps, and the like required for operation of the aqueous amine-contacting vessel are shown.

In the FIGURE, a contacting vessel 10 is shown. Contacting vessel 10 may be of any suitable type for achieving intimate contact between a gas stream and a liquid stream and is shown as a column. A sour gas stream containing $CO_2$ and $H_2S$ is introduced through a gas inlet line 12 into a lower portion of contacting vessel 10 with a lean aqueous amine stream being introduced into an upper portion of column 10 through a lean aqueous amine inlet line 14. A lean gas, which typically contains reduced quantities of $H_2S$, is removed through a line 16 and passed to discharge, if suitably reduced in $H_2S$, to further processing, to use as a process stream and the like. The treatment and use of such gas streams is considered to be well known to those skilled in the art and the further treatment or use forms no part of the present invention.

A rich aqueous amine stream is recovered through a rich aqueous amine line 18 and passed to treatment to release the absorbed gases and regenerate the rich amine to produce a lean amine stream as well known to those skilled in the art. Typically the absorbed gases are released by heating the rich amine to release the absorbed gases and produce a lean aqueous amine. The after treatment of the stream in line 18 forms no part of the present invention. Typically, the rich aqueous amine stream after regeneration by removal of the absorbed gases may be returned with some adjustments, such as pressure and temperature, as the lean amine stream in line 14.

Column 10 as shown may comprise a column of gas/liquid contacting devices (not shown). Typically, column 10 is divided into at least two and preferably a plurality of sections. Preferably, each of the sections has a liquid contacting efficiency of at least about one theoretical tray.

At the upper portion of each section, an aqueous amine withdrawal line 20 is positioned to withdraw a liquid aqueous amine stream from column 10. This stream is withdrawn through line 20 by a pump 22 and passed through a heat exchanger 24 and then through a distribution line 26 from which it may be returned to the column via some or all of lines 28 upstream, relative to the gas flow, from aqueous amine removal line 20. The aqueous amine stream is cooled in heat exchanger 24 to a temperature suitable to maintain a temperature in column 10 from about 50 to about 150° F. and desirably from about 70 to about 100° F. As the temperature is reduced, the selectivity to $H_2S$ absorption is increased. As shown by dotted lines 30, 30' and 30", heat exchangers 24, 24' and 24" can be bypassed if it is desired to maintain circulation through lines 20, 26, and 28, without cooling. However, since the absorption of $CO_2$ and $H_2S$ in the aqueous amine solution is exothermic, the temperature continues to increase across each section to the detriment of the $H_2S$ absorption and $CO_2$ rejection processes. The cooled aqueous amine may be returned through one or all of lines 28 in a first section. Alternatively the cooled aqueous amine may be returned to column 10 at any point between gas inlet 12 and lean amine inlet 14. The temperature in line 20 may be monitored to determine the temperature in column 10 and additional or less cooling may be used to maintain the temperature in line 20 (i.e. in column 10 at the withdrawal point) within a desired range. Alternatively at least one thermocouple (not shown) may be positioned to monitor the temperature at one or a plurality of locations in column 10.

Similar cooling systems are shown for a second and a third section by lines 20' and 20" with the associated lines corresponding to the lines discussed in connection with the first section being shown by primes or double primes. The use of some or all of these systems to control the temperature in column 10 is effective to maintain the temperature within the desired range. The sour gas may be charged through line 12 at a temperature of about 50–150° F. and in many instances it may be desirable to operate column 10 at a temperature from about 70 to about 90° F.

It will be noted that each section includes a sour gas inlet A, a lean aqueous amine inlet B, a rich amine outlet C and an outlet for a lean gas stream D, as shown by reference to first section 20.

As indicated previously, the absorption of the $CO_2$ and $H_2S$ in aqueous amine solutions is exothermic. For instance, a stream at 100° F. and containing 20 mole percent $CO_2$ and 2 to 3 mole percent $H_2S$ could be expected to raise the temperature of a contacting aqueous amine stream to approximately 150° F. upon absorption of the $CO_2$ and $H_2S$.

Preferably the amine is present in the aqueous solution in an amount from about 5 to about 60 wt. %. Desirably the concentration is from about 25 to about 50 wt. %.

Suitable amines are selected from the group consisting of triethanolamine, 2-(2 aminoethoxy) ethanol, methyldiethanolamine, diisopropylamine, methylmonoethanolamine, dimethylmonoethanolamine, aminomethylpropanol and mixtures thereof. Of these methyldiethanolamine, diisopropylamine, methylmonoethanolamine are preferred.

By the use of these amines according to the present invention an increased $H_2S$ concentration in the gas stream recovered upon regeneration of the rich aqueous amine (acid gas) is achieved. For instance, with a gas stream containing 24.6 mole percent $CO_2$ and 1.75 mole percent $H_2S$, with the balance of the stream being hydrogen and carbon monoxide at 375 psig and at a temperature of 105° F., the acid gas produced will contain 13 vol % $H_2S$ when treating at a temperature of 105° F. with methyldiethanolamine (MDEA) by conventional methods. In the method of the invention using inter-section cooling at the same conditions with the same gas stream an acid gas stream containing 33 vol. % $H_2S$ is produced.

In Claus processes, it is desirable that the inlet gases have a $H_2S$ concentration of at least 10 and preferably 13 vol % $H_2S$ for effective sulfur production.

As discussed previously, many approaches have been used in an attempt to improve the $H_2S$ selectivity of amine processes. These approaches have used exotic amine compounds, ultra pure lean amine solutions and the like. By the process and system of the present invention, conventional aqueous amine solutions can be used and the $H_2S$ selectivity is markedly increased by maintaining the temperature in column 10 at a temperature from about 50 to about 150° F. This is only possible by the cooling along the length of the column. Such cooling has not been used previously to Applicants' knowledge. The process of the present invention utilizes a heat exchanger wherein the aqueous amine solution may be withdrawn at one or more points along the length of the column, cooled and returned to the column at a temperature consistent with the maintenance of the temperature in column 10 at a more constant temperature, which may be desirably between 50 and 150° F. and is preferably about 70 to 100° F. This temperature is readily maintained by the withdrawal of a selected portion of the aqueous amine stream as required in at least a portion of the sections for cooling and return to the column so that the temperature in the column can be maintained at the desired level along the length of the column. By the use of conventional aqueous amine solutions in a column according to the present invention, greatly improved selective absorption of $H_2S$ is achieved.

The system and method of the present invention are effective not only with streams containing $CO_2$ and $H_2S$ in a ratio of as low as 3:1, but are equally effective with much higher ratios of $CO_2$, for instance about 20:1 or higher. The $H_2S$ is still selectively absorbed with a major portion of the $CO_2$ passing through the column unabsorbed. This permits the use of the method and system of the present invention to produce a desired high concentration of $H_2S$ in the gases recovered from the rich amine solution.

Having thus described the invention by reference to certain of its preferred embodiments, it is respectfully pointed out that the embodiments described are illustrative rather than limiting in nature and that many various and modifications are possible within the scope of the present invention.

Having thus described the invention, we claim:

1. A method for increasing the $H_2S$ selectivity of absorption from a gas containing $CO_2$ and $H_2S$ in a ratio where the $CO_2$ is significant to the concentration of $H_2S$ in an amine treating process, the method comprising:

a) passing the gas into an aqueous amine-contacting vessel with the aqueous amine;

b) maintaining the temperature in the contacting vessel at a temperature between 50 and 150° F. by withdrawing cooling and returning to the contacting vessel a quantity of the aqueous amine;

c) recovering a rich aqueous amine solution from the contacting vessel, the rich amine solution being selectively enriched with $H_2S$;

d) recovering an $H_2S$ stream having an $H_2S$ content of at least about 10 volume percent $H_2S$ from the rich aqueous amine from the contacting vessel; and, e) recovering the gas at least partially depleted of $H_2S$ from the contacting vessel.

2. The method of claim 1 wherein an amine is present in the aqueous amine in an amount from about 5 to about 60 weight percent.

3. The method of claim 1 wherein the amine is an alkanolamine selected from the group consisting of triethanolamine, 2-(2 aminoethoxy) ethanol, methyldiethanolamine, diisopropylamine, methylmonoethanolamine, dimethylmonoethanolamine, aminomethylpropanol and mixtures thereof.

4. The method of claim 3 wherein the alkanolamine is selected from the group consisting of methyldiethanolamine and diisopropymonoethanolamine.

5. The method of claim 1 wherein the gas is passed into the contacting vessel at a temperature from about 50 to about 150° F.

6. The method of claim 5 wherein the temperature is from about 50 to about 110° F.

7. The method of claim 5 wherein the temperature is from about 80 to about 100° F.

8. The method of claim 1 wherein the temperature in the contacting vessel is from about 50 to about 130° F.

9. The method of claim 1 wherein the $H_2S$ stream contains about at least 13 volume percent $H_2S$.

10. The method of claim 1 wherein a quantity of the aqueous amine is withdrawn, cooled and returned to the contacting vessel at a plurality of locations in the contacting vessel.

11. A system for increasing the $H_2S$ selectivity of absorption from a gas containing $CO_2$ and $H_2S$ in a $CO_2:H_2S$ ratio of at least about 3 in an amine treating system, the system comprising:

a) an amine contacting vessel including at least two sections having a gas:liquid contacting efficiency of at least about 1 theoretical tray and having a sour gas inlet, a lean aqueous amine inlet, a rich aqueous amine outlet and an outlet for a lean gas stream having a reduced $H_2S$ content;

b) at least one aqueous amine withdrawal line positioned to withdraw aqueous amine from the contacting vessel;

c) a heat exchanger positioned in fluid communication with the aqueous amine withdrawal line to cool the aqueous amine to a selected temperature to produce a cooled aqueous amine; and, d) at least one return line in fluid communication with the heat exchanger and the contacting vessel to return at least a portion of the cooled aqueous amine to the contacting vessel.

12. The system of claim 11 wherein the contacting vessel comprises at least three sections, each of the sections having a contacting efficiency of at least one theoretical tray.

13. The system of claim 11 wherein the contacting vessel is adapted to countercurrently contact the gas stream and the lean amine.

14. The system of claim 11 wherein at least one section has an aqueous amine withdrawal line positioned to withdraw an aqueous amine stream downstream, relative to gas flow in the contact vessel, from the sections.

15. The system of claim 14 wherein a plurality of sections have an aqueous amine withdrawal line positioned to withdraw an aqueous amine stream from the plurality of sections.

16. The system of claim 15 wherein at least a portion of the aqueous amine withdrawal lines are in fluid communication with a heat exchanger and at least one return line is in fluid communication with the contacting vessel.

17. The system of claim 16 wherein the at least one return line is in fluid communication with the contacting vessel at a point downstream from the at least one aqueous amine withdrawal line in fluid communication with the contacting vessel.

18. The system of claim 11 wherein a plurality of return lines are positioned in fluid communication with the heat exchanger and the contacting vessel.

19. The system of claim 16 wherein the return lines are in fluid communication with the contacting vessel at points downstream from the aqueous amine withdrawal line in fluid communication with the heat exchanger.

* * * * *